(12) United States Patent
Perälä et al.

(10) Patent No.: US 7,664,387 B2
(45) Date of Patent: Feb. 16, 2010

(54) EXPOSURE TIME SELECTION IN A TRANSMISSION APPARATUS WITH A CAMERA

(75) Inventors: Mikko Perälä, Kangasala (FI); Juha Alakarhu, Tampere (FI)

(73) Assignee: Nokia Corporation, Espoo (FI)

( * ) Notice: Subject to any disclaimer, the term of this patent is extended or adjusted under 35 U.S.C. 154(b) by 557 days.

(21) Appl. No.: 11/515,347

(22) Filed: Sep. 1, 2006

(65) Prior Publication Data

US 2008/0056697 A1    Mar. 6, 2008

(51) Int. Cl.
*G03B 9/70* (2006.01)
(52) U.S. Cl. .................. 396/166; 396/180; 348/371
(58) Field of Classification Search ............. 396/180, 396/166; 348/370, 371
See application file for complete search history.

(56) References Cited

U.S. PATENT DOCUMENTS 6,167,199 A * 12/2000 Fukui ...................... 396/57
6,748,165 B2 * 6/2004 Ogasawara ................ 396/56
7,428,378 B1 * 9/2008 Warpakowski Furlan .... 396/157
2003/0117491 A1 * 6/2003 Avni et al. ................. 348/77
2004/0223075 A1 * 11/2004 Furlan et al. .............. 348/363

OTHER PUBLICATIONS

"Geometric Models of Rolling-Shutter Cameras" by Christopher Geyer, et al, EECS Department, University of California, Berkeley, pp. 1-8, date unknown.

* cited by examiner

*Primary Examiner*—Christopher E Mahoney
*Assistant Examiner*—Fang-Chi Chang (57) ABSTRACT

A communications apparatus is shown having an imaging device for capturing an image, and a flash for lighting an image to be captured. Also shown is the use of the apparatus. Software for matching a flash performance to other functions of a device is also shown. A radio communications apparatus embodiment is shown that comprises an imaging device including an image sensor and a rolling shutter, and a flash unit. The flash unit is operated at a certain flash frequency, and an exposure time is determined according to the flash frequency so that the image sensor is uniformly exposed by the rolling shutter during the determined exposure time.

28 Claims, 6 Drawing Sheets

EXPOSURE TIME SELECTION IN A TRANSMISSION APPARATUS WITH A CAMERA

TECHNICAL FIELD OF THE INVENTION

The invention concerns a communications apparatus having an imaging device for capturing an image, and a flash for lighting an image to be captured. Furthermore the invention concerns the use of the apparatus. Yet furthermore the invention concerns a software for matching a flash performance to other functions of a device.

BACKGROUND ART

An apparatus for radio communications having an imaging device with a flash, such as a camera mobile phone, typically has a flashunit based on one or more high power LEDs. High power LEDs are driven by high power drivers. The combination of a high power LED and a high power driver can offer a very competitive flash solution for mobile imaging devices. Known achieved 4-6 W power peaks in these flash solutions can push the camera operational range up to 2-2.5 meters in the dark. However, having radio connection capability and a camera flash in the same device typically causes problems. A simultaneous radio transmission and use of the flash may, especially when such efficient flashes are used, overload the safety circuit in the battery. Even with lower power flashes, image quality suffers when a camera flash and a radio transmission require power simultaneously. In order to compensate the power needs, an extra condensor or capacitor for storing charge for delivering current for power peaks can be employed. Alternatively, a more effective battery can be used for better satisfying the increased power needs. But such solutions generally affect the overall design, increase size and weight of the device, and are thus not desired.

One solution in order to avoid problems is to keep a LED flash current at such a low level that operation with a simultaneous transmission is possible. However, in this way the flash performance is typically left insufficiently low.

Figure 1:
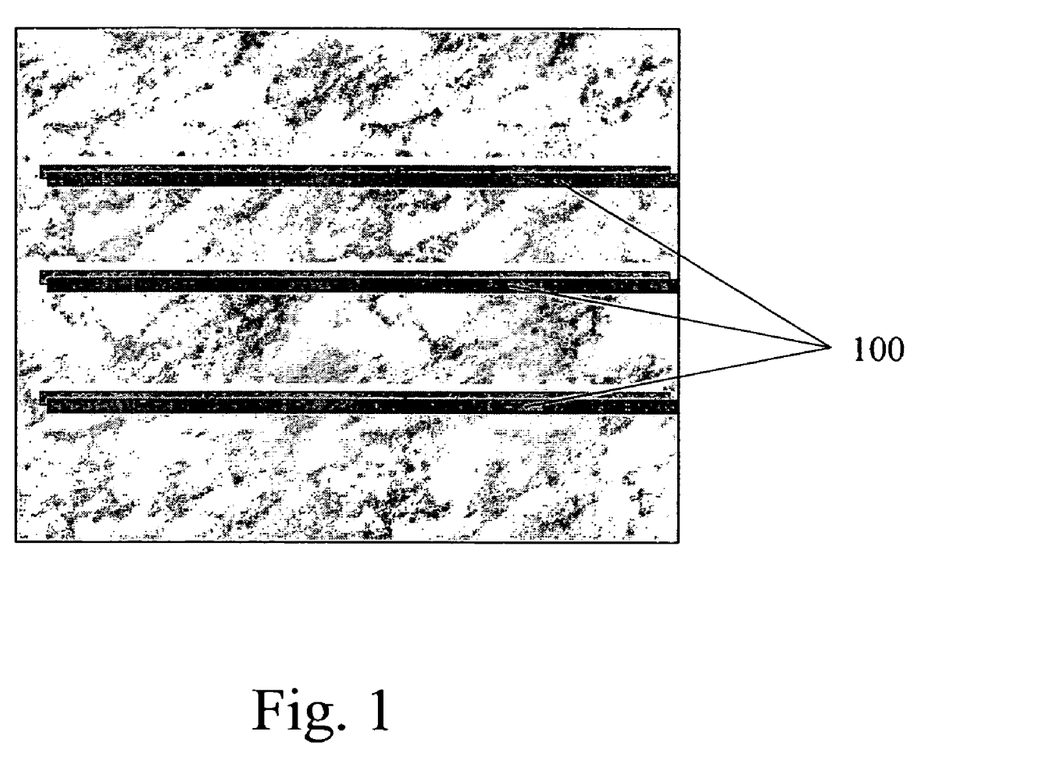
FIG. 1 depicts an example of an image according to prior art.

In order to be able to enhance the flash performance and reduce high current peaks from the battery, the transmission operations should be synchronized with the flash. In one solution accomplishing the synchronization the driver circuit has a dedicated input pin for masking. Masking is done during transmission and it disables the flash LED driver during the current demanding phase of the power amplifier controlling the transmission. However, masking the LED current creates a further problem. When the LED current is altered, i.e. chopped during an image exposure, the image will have dark, generally horizontal stripes. An example of such an image having horizontal stripes 100 is presented in a FIG. 1. If transmission occurs during the exposure of certain rows of the image, the current is directed for the transmission, thus the flash is disabled. The unpowered time of flash makes the captured image unequally exposured. The resulting image then has dark stripes 100 in corresponding rows, as shown in FIG. 1.

The disclosed image quality problems are present when a rolling shutter is used. A rolling shutter typically exposes the image row by row. The exposure thus proceeds typically starting from the first, uppermost row. After the first row is exposed, the exposure is accomplished for the next row. And similarly each row of the image is exposed, one by one, in the corresponding row order.

SUMMARY OF THE INVENTION

It is the objective of the invention to allow simultaneous transmission and image capture with a rolling shutter, using a flash. Another objective of the invention is avoid visible stripes in an image captured with a rolling shutter, while enabling use of an effective flash in a communication apparatus. Another objective of the present invention is to enable reasonable flash performance for a communication device having a rolling shutter imaging device. Yet another objective of the invention is to avoid visible stripes in an image captured with a rolling shutter, while enabling use of an effective flash. Yet another objective of the present invention is to enable reasonable flash performance for a imaging device having a rolling shutter.

In transmission devices, such as radio transmission devices, flash current is chopped according to transmission frequency so that in the active, power demanding phase of the transmission the flash unit is disabled. Or at least effectiveness of the flash unit is decreased from its maximum. The transmission has some constant transmission frequency, and accordingly the current provided is altered between the two functions. Thus a flash frequency, i.e. active flash phases, can be determined as opposing of the transmission frequency. In order to provide equal exposure on the image sensor area, the exposure time is selected so that each exposure starts and ends at the same phase of the flash frequency. The determined exposure time is multiple of flash frequency. Generally a power amplifier driving the transmission unit provides a signal indicating the transmission frequency. The flash power is cut off accordingly, thus forming a flash frequency illustrating active phases of the flash unit. According to embodiments of the present invention exposure time is selected to be a multiple of the flash frequency.

According to an embodiment of the invention a communications apparatus comprises a transmission unit for transmitting at a certain transmission frequency, an imaging device including an image sensor and a rolling shutter, and a flash unit. During the transmission the flash unit is operated at a flash frequency corresponding to the transmission frequency, and an exposure time is determined according to the flash frequency so that the image sensor is uniformly exposed by the rolling shutter during the determined exposure time. When using rolling shutter every row of image sensor is advantageously equally exposured in order to capture good quality images. The exposure time can be extended by a constant value corresponding to flash frequency such that the exposure time is always a multiple of the flash frequency. When exposure is starting and ending at the same phase of the flash frequency, every row of image sensor gains equal amount of light, i.e. the image sensor area is uniformly exposed by the rolling shutter.

A method according to an embodiment of the invention comprises transmitting at a certain transmission frequency by a transmission unit, exposing an image sensor of an imaging device by a rolling shutter, illuminating an object to be captured by a flash unit, operating the flash unit at a flash frequency corresponding to the transmission frequency, and determining an exposure time according to the flash frequency so that the image sensor is uniformly exposed by the rolling shutter during the determined exposure time.

According to an embodiment of the invention a flash unit is arranged to illuminate an object to be captured using a rolling shutter in a communication device transmitting at a certain transmission frequency. The flash unit is arranged to operate in a flash frequency corresponding to the transmission frequency, and an exposure time is determined to be a multiple of the flash frequency. The flash frequency is proportional to the transmission frequency having an opposing phase at any moment of time compared to it. I.e. during active phase of transmission the flash is inactive (reaching its minimum value), and during inactive phase of transmission the flash is active (reaching its maximum value).

In general, flash frequency can be determined based on any component or function of a device. Thus it can be independent of transmission frequency, but dependent on some other component or function of a device. It is possible to arrange the flash unit to operate in a certain flash frequency according to embodiments of the invention. Thus the flash can be switched on and off at certain frequency according to embodiments of the invention. Typically flash frequency is determined to oppose some other power demanding function/unit such that the power is alternately supplied to the flash unit and to the other unit at a certain frequency.

Further there is provided a program component comprising programmable means for performing steps according to embodiments of the invention, and a program executing steps according to embodiments of the invention, when run on a computer.

The image created by the imaging device is exposed equally due to the determined exposure time(s), and dark lines or stripes are essentially eliminated. Thus stripes in the resulting image are avoided due to uniform exposure of the image sensor area. Embodiments of the present invention allow using a high-power LED flash in a device having and imaging apparatus, for example in a mobile camera phone, or other corresponding apparatus or a communication device. The resulting images are equally exposed, even during transmission, or other power demanding function of an apparatus. The flash size may be relatively small, since there is no need for a separate component, e.g. a condensator, in order to compensate a temporary power consumption of a transmission unit, for example. There is no extra energy storage need, but the embodiments of the present invention can be utilized with conventional batteries, since the battery requirements are less challenging than in prior solutions. The image quality is perceivably enhanced, since no dark stripes occur in resulting images.

BRIEF DESCRIPTION OF THE DRAWINGS

The invention will now be described, by way of examples only, with reference to the accompanying drawings, in which.

DESCRIPTION OF VARIOUS EMBODIMENTS

Embodiments of the invention refer to devices able to implement imaging i.e. including an imaging device, such as camera. In the current application the term imaging refers primarily to a process of capturing, processing, storing and showing an image by imaging devices. The imaging can be done by a mobile imaging device having a digital camera, thereby obtaining digital images in the phone. An example of such a mobile communication imaging device, which can take a picture using a digital camera built in it, is a mobile camera phone. As the technology has advanced rapidly, this definition has broadened to include not only print-quality still images but also video capture with mobile communication devices.

The communication referred herein is generally established via radio transmission technology, using radio transmission network, although other similar type of communications can be utilized within the scope of the invention. A radio transmission is typically performed in bursts, or data packets, although a continuous transmission having a certain continuous transmission frequency is also possible. A burst is a transmission quantum transmitted as one transmission unit, and the transmission includes several units transmitted serially. The serial type of transmission can be employed in various different types of radio communications. According to embodiments of the present invention a transmission has a certain transmission frequency, in which the transmission units are transmitted. The transmission frequency is determined according to times when the power amplifier driving the transmission is active. Typically the transmission frequency for a certain radio system is constant, e.g. transmission units are transmitted at a constant frequency. The transmission frequency of a device can be altered, but a momentarily used constant value thereof can nevertheless be established. In various embodiments, the transmission frequency is a constant parameter that is available to the camera.

Figure 2:
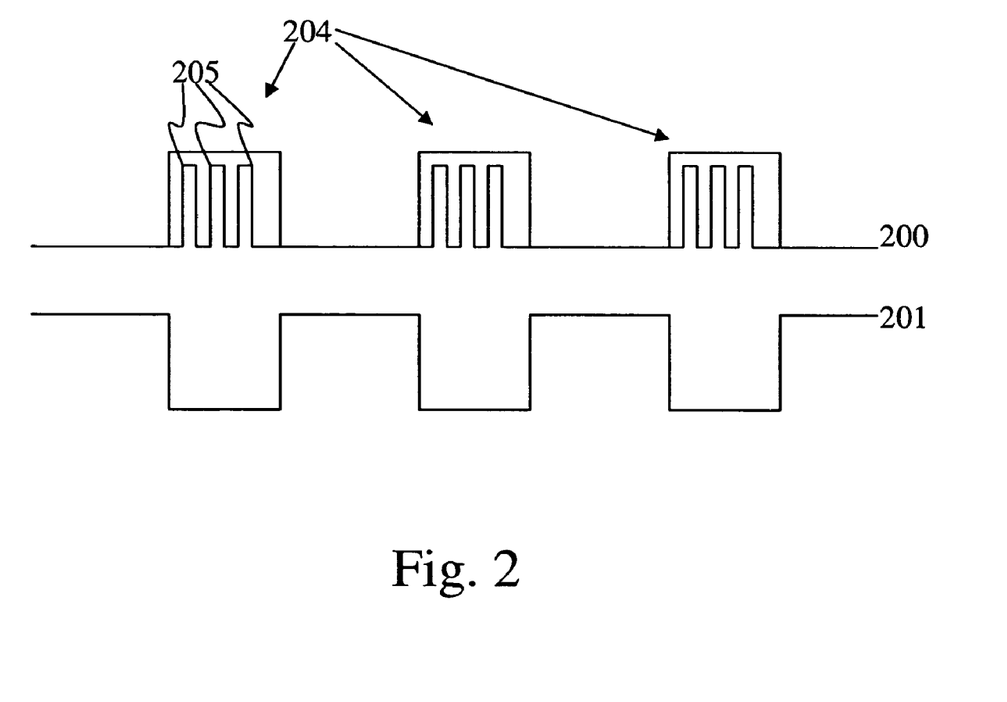
FIG. 2 depicts transmission frequency and the corresponding flash frequency according to an embodiment of the invention.

An embodiment of the present invention is illustrated in FIG. 2, where the upper graph 200 illustrates radio transmission implemented in transmission units. Serial transmission units are sent to the network at certain time intervals, i.e. at a constant transmission frequency. Each peak of the graph 200 depicts a transmission unit. Each unit can generally include alternation, as illustrated inside the transmission peaks in FIG. 2. The alternation inside a transmission unit forms so called micro peaks 205 inside the so called macro peaks 204, which form the transmission peaks, thereby as a whole forming the graph 200. In the present disclosure a transmission unit refers to the macro peaks 204, and the possible micro peaks 205 inside those are not relevant, and thus are not discussed here in further detail. The peaks 204 thus also illustrate the active, power demanding phase of the transmission. Correspondingly, flash power, i.e. illumination, is illustrated by the lower graph 201. Since the battery of the device alternatively supplies power for the transmission unit and for the flash unit, the active time of transmission unit is used to induce a disabling of the flash unit. Generally, while a transmission unit is transmitted, the flash unit is turned off. Instead of turning the flash off, it is possible to minimize the momentary flash current. Thus there is a relation between the transmission frequency and the time when the flash is at its maximum. The transmission frequency of the radio signals and flash performance are dependent on each other, their active (or maximum) phases being opposite to each other. Since the transmission frequency is an available value, the flash frequency can also be determined accordingly.

In the following description the flash frequency, determined in accordance with the transmission frequency, is referred to. This is but one example of implementation of the invention and it is to be understood that other functions or units of a device can be used as well in determining a flash frequency or similar unit. According to an embodiment of the present invention, ambient light frequency can also be taken into account. The surrounding ambient light can be detected by a specific sensor, or in some other way, known as such. According to the embodiment, the determined flash frequency is combined with the detected ambient light frequency, and the combined sum frequency is then used as a flash frequency, also referred to as such in this disclosure, when determining the exposure time according to embodiments of the present invention.

Figure 3A:
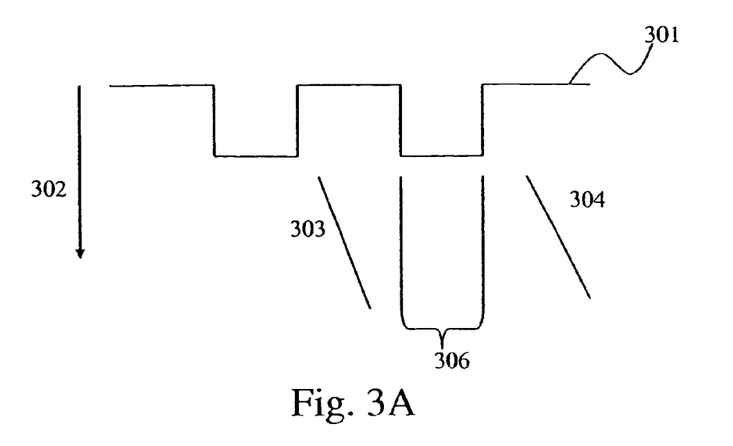
FIGS. 3A and 3B depict examples of selected exposure times in accordance with embodiments of the invention.
Figure 3B:
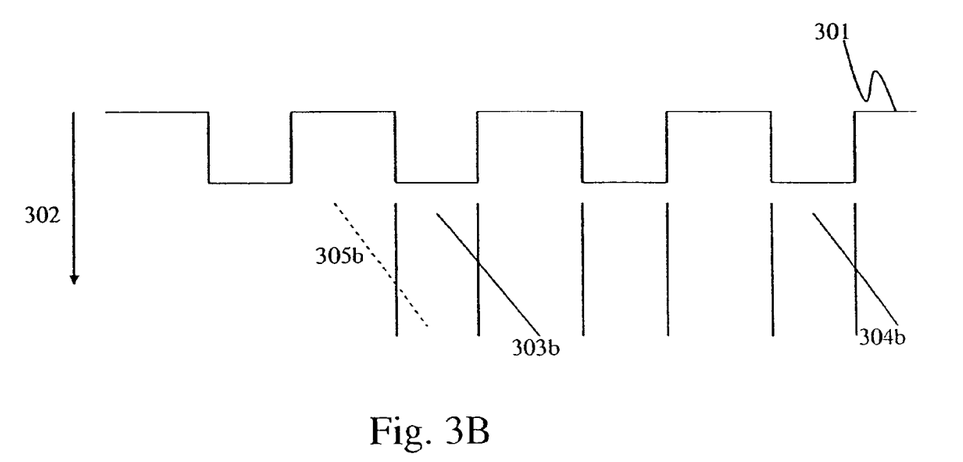

FIGS. 3A and 3B present embodiments according to the present invention. Ar graph 301 represents flash performance having negative peaks such as a negative peak 306, which correspond to an active transmission phase (e.g., peaks 204 of FIG. 2), where the flash is generally turned off. These (negative) peaks of flash performance occur in certain time intervals. Thus the flash is regularly disabled, having a certain flash frequency. A vertical arrow 302 depicts a reading direction of a row of a sensor area, which is being exposed in order to capture an image. Generally exposure depends on properties of the camera, exposure time and ambient illumination. Since the rolling shutter exposes the image sensor area row by row, a special design is required in order for each row to gain an equal amount of light, and thus to achieve a uniformly exposed image, not including any dark stripes.

According to one embodiment of the present invention, exposure time is selected so that it does not coincide with the negative flash peak, but occurs in between such peaks. Here the exposure of the whole image area occurs between the negative flash peaks, thus the flash is enabled during the exposure. The exposure timing is thus selected such that it ends before the next transmission starts, i.e. before the negative flash peak occurs. According to the embodiment each row of the sensor area receives equal amount of light, since no flash cut off times occur during the exposure. However, such a solution restricts the exposure time a lot, and is thus not very usable.

According to another embodiment the exposure time is selected so that it always starts and ends at the same phase of the flash frequency. In an embodiment illustrated in FIG. 3A the first inclined line 303 represents the beginning of exposure of, e.g., a row of the sensor area 302. The exposure continues in time toward a second inclined line 304 that represents the end of the exposure of that row of the sensor area 302. The area in between the inclined lines 303, 304 thus depicts the exposure of a row of the sensor area. As will be appreciated, a repetition of this pattern results in each horizontal row starting from the inclined line 303 and ending to the inclined line 304 receiving an equal amount of light. There is an equal amount of time, during which the flash is off (the flash is off during the lower part of the graph 301 (during negative peaks) in the figure, for example a reference 306) and during which the flash is on (positive flash peaks), for each row of the sensor area. Thus each row of the sensor area is equally exposed. This is due to starting and ending the exposure time at the same phase of the flash frequency.

According to an embodiment illustrated in FIG. 3B the exposure starts 303b during a transmission, i.e. during a negative flash peak. In order to have equally exposed image sensor area (e.g., exposed by rows), the exposure time must also end at the same phase of some following flash peak. Here the exposure is a duplicate of the flash frequency, thus ending on the same phase of the second following flash peak, as depicted by inclined line 304b. Again, each row of the image area receives an equal amount of light, and thus the image sensor area is uniformly exposed. Generally the exposure time is selected to be a multiple of the flash frequency in order to expose the image sensor area uniformly. The exposure time can thus be altered by a multiple of a flash frequency (corresponding to the transmission frequency). In between inclined lines 303b and 304b the rolling shutter exposes with an exposure time adjusted according to the embodiments of the present invention. The resulting image 401 in FIG. 4B is equally exposed, and thus has essentially the same amount of light in each row, and no dark band(s) occur.

Generally no synchronization is needed for starting the exposure, but it can start basically in any phase of the flash frequency, as long as it also ends at the corresponding phase. There are a few situations, where some considerations for starting the exposure is needed, but these rare cases will be discussed in more detail later in the disclosure.

Figure 4A:
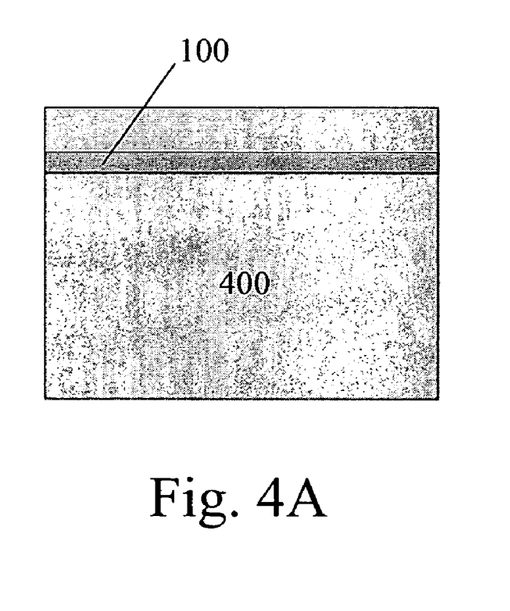
FIGS. 4A & 4B depict an example of the resulting images with selected exposure times illustrated in FIG. 3B.

In FIG. 3B the start of the exposure 303b and end of the exposure 304b have to be exactly at a multiple of a wavelength (or frequency) of graph 301 distance from each other, i.e. occur at the same phase of the frequency of the graph 301. This way the embodiments are realized and no dark bands occur. For illustration, a non-working example is presented: dotted line 305b depicts a situation, where the embodiments are not realized, but a dark band will occur, as depicted in FIG. 4A. Inclined dotted line 305b in the FIG. 3B illustrates another starting point of the exposure time. If the exposure ends at the inclined line 304b, as presented previously, the exposure time between the inclined lines 305b and 304b is not a multiple of the flash frequency. Thus the image sensor is not uniformly exposed, but the amount of light in the image sensor area will be altered row by row. In between the inclined lines 305b and 304b the rolling shutter exposures with a non-adjusted exposure time, whereby the resulting image of FIG. 4A includes a dark band 100 due to non-uniform exposure of the image area.

Figure 4B:
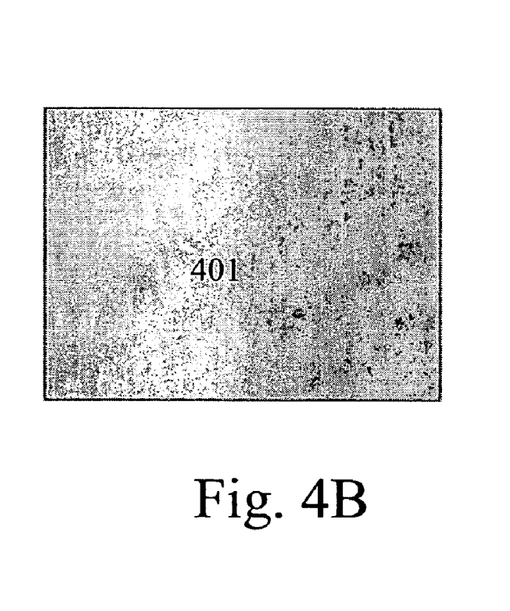

The resulting images are illustrated in FIGS. 4A and 4B, where top refers to starting row read by the rolling shutter horizontally. Here the rolling shutter reads the image sensor row by row horizontally, thus causing a horizontal dark band 100 to the resulting image 4A. This is only an example, and the rolling shutter can have alternative reading directions, which would thus effect to the orientation of the dark band correspondingly.

Figure 5:
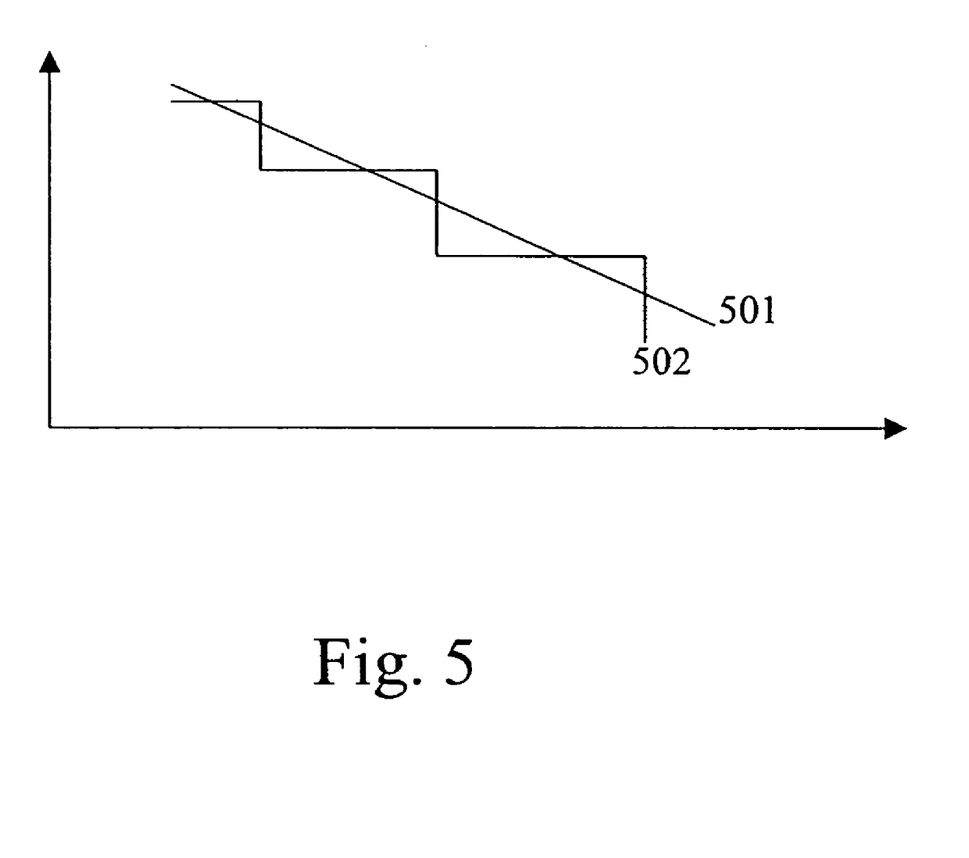
FIG. 5 depicts exposure time as function of illumination according to embodiments of the invention.

Since the selecting of certain exposure times according to the embodiment of the invention is done based on flash cut off times, all exposure times are not allowed. The non-allowed exposure times are those that are not a multiple of the flash cut off frequency. FIG. 5 illustrates allowed exposure times according to an embodiment of the present invention. The vertical axis illustrates the exposure time and the horizontal axis illustrates luminance on the image sensor. Straight line 501 depicts conventional exposure times, when all exposure times are possible. The longer the exposure time is, the more light is gained to the image sensor; the luminance increases linearly as function of the exposure time. The staircase line 502 illustrates exposure times according to present embodiments. The horizontal parts of the line 502 are the allowed exposure times, and the vertical parts of the line 502 illustrate the not permitted exposure times. As seen in FIG. 5 there can occur smallish over-exposure or under-exposure according to staircase line 502, when compared to the ideal linear line 501. Over- or under-exposures during not permitted exposure times can be compensated for. This is generally done by amplifying an under-exposed image in order to get more brightness, or by de-amplifying an over-exposed image in order to remove extra brightness from it. Thus if the resulting image is dark, the image signal is amplified. If the resulting image is too bright, the image signal is attenuated. Generally such compensation can be done using an amplifier block.

After a digital image is captured, the digital numbers are multiplied by a certain number, and transmitted to the display (viewfinder) only after the compensation is accomplished. Since the resulting image according to embodiments is close enough to the ideal, good results are achieved using e.g. such compensation. Another alternative is to use an analog amplifier of the image sensor for establishing corresponding compensation. According to this alternative possible need of compensation must be known already, when the image is captured. According to the embodiments such knowledge is available.

In practice, the beginning or initialization of the exposure should not coincide with the start of the radio transmission (i.e. the start of the flash cut off time). This is due to determining the exposure time based on the radio transmission frequency. Thus the transmission frequency should be known, when the exposure time is determined, in order to be able to determine the exposure time accordingly. Also if the exposure has just begun, and the transmission starts just after, it is probably not possible in practice to change the exposure time any more. Generally the transmission frequency should be known before the exposure starts. According to an embodiment the possible coinciding situation is handled so that if the exposure has begun, when transmission starts, the first image frame is abandoned, and the next frame is right after that started with an exposure time determined according to embodiments of the present invention. The user will typically not even notice such abandonment of a first frame. Generally transmission should always start first in order to enable determination of the exposure time based on it.

Figure 6:
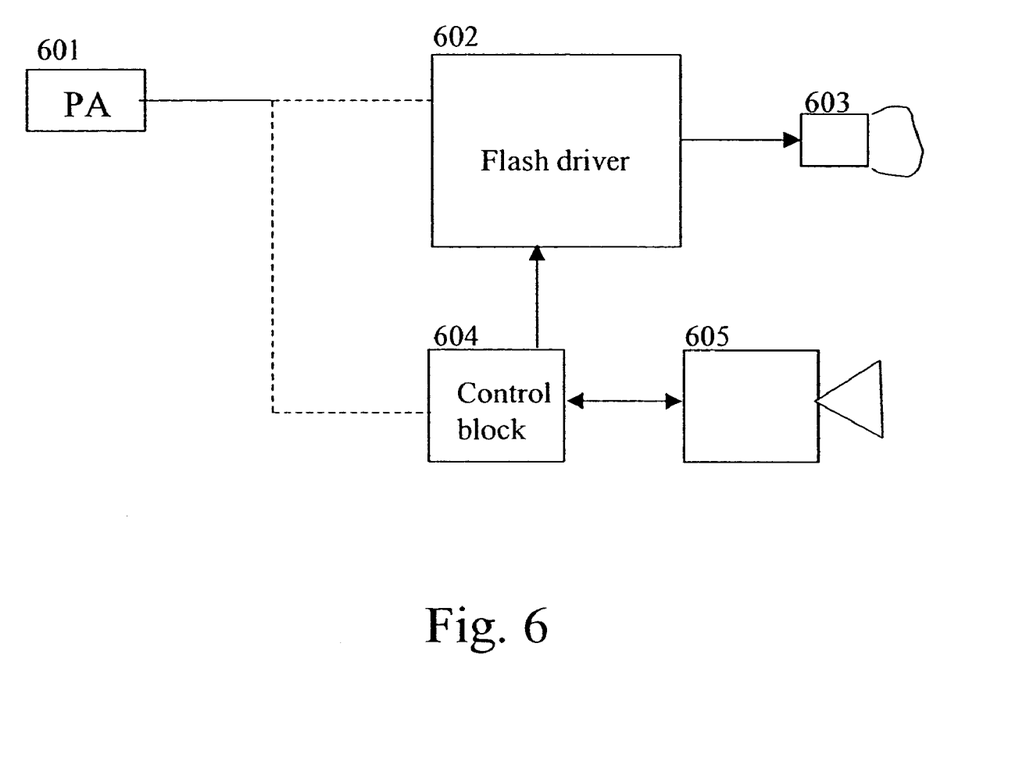
FIG. 6 depicts an apparatus according to an embodiment of the invention.

FIG. 6 depicts an example of an apparatus according to an embodiment of the invention. The apparatus comprises a power amplifier (PA) 601, which drives the transmission by feeding the transmission unit to the radio transmitter. Generally the power amplifier can operate at any operating radio frequency. For example, transmission frequency of transmission units in GSM is 217 Hz. A flash driver 602 drives a flash unit 603 by supplying power to it. A control block 604 controls operation of blocks and performs all computation operations, i.e. all processing is executed in the control block 604. The control block 604 controls the flash driver 602 and an image sensor 605, and possibly other blocks not depicted here. Image information exposed on the image sensor 605 is transmitted to the control block 604 for processing. The control block 604 is typically referred as a camera processor.

The power amplifier 601 provides so called transmission masking signal, which indicates when a transmission occurs and its frequency. The transmission masking signal oscillates, or pulsates, according to the transmission frequency, as illustrated e.g. by the pulsed line 200 in FIG. 2. The transmission masking signal can oscillate according to sent transmission units or their occurring times. If the transmission frequency is constant, alternatively only the time or the moment, on which the serial transmission unit takes place, can be indicated. Furthermore the time of the active transmission phase can be predetermined. Generally, the serial active transmission phases occur according to a certain pattern constantly, or regularly at a certain frequency. Even a momentary transmission has some accessible constant frequency.

The transmission masking signal can be transmitted to the flash driver 602, to the control block 604, or to the both. The control block 604 receives the transmission masking signal either directly itself, or alternatively accesses the information from some secondary source, e.g. from the flash driver 602 or some internal memory. Based on transmission masking signal the control block 604 can realize the constant transmission frequency. After establishing the current transmission frequency based on the transmission masking signal, the control block 604 establishes the exposure time so that it is multiple of the transmission frequency. The transmission masking signal is also indicated to the flash driver 602, either directly or through the control block 604. The flash driver 602 adjusts the flash current accordingly, as described previously, e.g. with 201 in FIG. 2.

The control block also performs operations of a program component comprising programmable, executable means according to embodiments. The program component comprises programmable means for attaining a transmission masking signal corresponding to a current transmission frequency, programmable means for determining a flash frequency according to the received transmission masking signal, and programmable means for determining an exposure time according to the determined flash frequency. The flash frequency is determined to correspond to the transmission frequency such that the pulses of the two have the same frequency and opposing phases. The phases are generally alternating between determined maximum and minimum values, and the opposing phases meaning that during maximum phase of the flash frequency transmission frequency is at its minimum, and vice versa, at any moment of time. The exposure time is determined to be a multiple of the determined flash frequency.

A program according to an embodiment of the present invention, when run on a control block, i.e. a processing block, executes steps of attaining a transmission masking signal corresponding to a current transmission frequency, determining a flash frequency according to the received transmission masking signal, and determining an exposure time according to the determined flash frequency. The determined flash frequency is corresponding to the transmission frequency by having the same frequency and an opposing phase at every moment, and the determined exposure time a multiple of the determined flash frequency.

Ramifications and Scope

Although the description above contains many specifics, these are merely provided to illustrate the invention and should not be construed as limitations of the invention's scope. It should be also noted that the many specifics can be combined in various ways in a single or multiple embodiments. Thus it will be apparent to those skilled in the art that various modifications and variations can be made in the apparatuses and processes of the present invention without departing from the spirit or scope of the invention.

The rolling shutter, used here by assumption, exposures the sensor area row by row, starting form the first (typically uppermost) row, and proceeding to the second row, after the first row is exposed, and so on, till the whole sensor area is exposed. The actual exposure direction is not essential for the present invention. The rolling shutter can proceed from left to right, from top to bottom, as well as the other way around, as long as it proceeds from some starting point to the corresponding end point in linear order of sensor elements, generally referred as rows. It is also possible to have a rolling shutter proceeding in two perpendicular, or some other way crossing directions. Further the direction is generally depend on the orientation of a rolling shutter in a device, and orientation of the device including a rolling shutter. Thus the rolling shutter reading direction in the present invention is by no means limited.

The flash unit according to the present invention can be implemented using several technologies. Although LEDs are generally used in flashes of the radio communication devices at the priority date of the invention, the invention is not restricted to LED flashes only. Generally Xenon flashes are as common, and despite their conventional use based on a one bright flash by discharging the Xenon lamp, also longer lighting can be achieved by turning the Xenon flash on sequentially. Thus also Xenon flashes can be applied as a flash units according to the present invention. Also any possible flashes, developed even after the priority date of the present invention can be utilized as well within the scope of the invention.

Also, flash frequency according to the invention can be determined independent of the transmission frequency. The flash frequency can be determined e.g. based on some other component or function of a device. According to the invention it is possible to arrange the flash unit to operate at a certain flash frequency as described in the embodiments of the invention, i.e. the flash can be switched on and off at a certain frequency according to embodiments of the invention.

The invention claimed is:

1. An apparatus comprising
an imaging device including an image sensor and a rolling shutter;
a flash unit, and
a transmission unit configured to transmit at a certain transmission frequency,
wherein the flash unit is operable at a certain flash frequency, and an exposure time is determinable according to the flash frequency so that the image sensor is uniformly exposed by the rolling shutter during the determined exposure time; and
wherein during transmission the flash unit is operated at the flash frequency corresponding to the transmission frequency such that the two have opposing phases at any moment of time.

2. The apparatus according to claim 1, wherein the exposure time is determined so that starting of the exposure and ending of the exposure occur at the same phase of the flash frequency.

3. The apparatus according to claim 1, wherein the determined exposure time is a multiple of the flash frequency.

4. The apparatus according to claim 1, wherein a control block determines the exposure time such that it is a multiple of a current flash frequency.

5. The apparatus according to claim 1, wherein a control block controls a flash driver and a camera sensor, and determines the flash frequency and the exposure time.

6. The apparatus according to claim 1, wherein the flash frequency is combined with a determined ambient light frequency, and a combined sum frequency is used as the flash frequency, when determining the exposure time.

7. The apparatus according to claim 1, wherein determined exposure times, including part of all conventionally possible exposure times, are compensated in order to achieve a resulting image corresponding to a resulting image exposed using all conventionally possible exposure times.

8. The apparatus according to claim 7, wherein an under-exposed or an over-exposed image data is amplified to a more ideal exposure level.

9. The apparatus according to claim 1, wherein the flash unit is operated at a flash frequency corresponding to another power demanding function of the apparatus.

10. The apparatus according to claim 9, wherein the power is alternately supplied for the flash unit and for the another power demanding function.

11. The apparatus according to claim 1, wherein the flash unit has an active phase during the inactive phase of the transmission.

12. The apparatus according to claim 1, wherein during the transmission power is alternately supplied for a power amplifier driving the transmission unit and for a flash unit driver driving the flash unit.

13. The apparatus according to claim 1, wherein a current transmission frequency is provided by the transmission unit.

14. The apparatus according to claim 1, wherein a transmission amplifier driving the transmission unit provides a transmission masking signal indicating a current transmission frequency.

15. The apparatus according to claim 14, wherein a flash driver supplies power for the flash unit according to the flash frequency determined based on the transmission masking signal.

16. The apparatus according to claim 1, wherein a control block determines an exposure time according to the flash frequency, which flash frequency is determined to have a same frequency in opposing phase as a current transmission frequency.

17. The apparatus according to claim 1, wherein the transmission is started before the exposure is started in order to be able to determine the exposure time according to the flash frequency.

18. The apparatus according to claim 1, wherein if an exposure is started simultaneously or before the transmission is started, a first exposed frame is abandoned, and the exposure time is determined according to a therafter determined transmission frequency, and the exposure is started again using the determined exposure time.

19. The apparatus according to claim 1, wherein the transmission is a radio transmission.

20. A method comprising
exposing an image sensor of an imaging device by a rolling shutter,
illuminating an object to be captured by a flash unit,
operating the flash unit at a certain flash frequency,
determining an exposure time according to the flash frequency so that the image sensor is uniformly exposed by the rolling shutter during the determined exposure time, and
transmitting at a certain transmission frequency by a transmission unit, wherein the flash frequency is corresponding to the transmission frequency such that the two have opposing phases at any moment of time.

21. The method according to claim 20, wherein determined exposure time is a multiple of the flash frequency.

22. A flash unit configured to illuminate an object to be captured using a rolling shutter, wherein the flash unit is further configured to operate at a certain flash frequency, and an exposure time is determined according to the flash frequency and wherein the flash frequency is proportional to a transmission frequency of a communication device, the flash frequency and the transmission frequency having opposing phases at any moment of time.

23. The flash unit according to claim 22, wherein the exposure time is determined to be a multiple of the flash frequency.

24. A computer readable medium stored with code, which when executed by a processor, causes to be performed
determining a flash frequency;
determining an exposure time according to the determined flash frequency,
determining a transmission masking signal corresponding to a current transmission frequency, and
determining the flash frequency according to the determined transmission masking signal so that the flash frequency is determined to correspond to the transmission frequency such that the flash frequency and the transmission frequency have opposing phases at any moment of time.

25. The computer readable medium according to claim 24, wherein the exposure time is determined to be a multiple of the determined flash frequency.

26. A computer readable medium stored with code, which executed by a processor, causes to be performed:
   determining a flash frequency,
   determining an exposure time according to the determined flash frequency,
   attaining a transmission masking signal corresponding to a current transmission frequency, and
   determining the flash frequency according to the transmission masking signal, wherein the determined flash frequency is proportional to the transmission frequency such that the flash frequency and the transmission frequency have opposing phases at any moment of time.

27. The computer readable medium according to claim 26, wherein the determining of exposure time is at a multiple of the determined flash frequency.

28. An apparatus comprising
   means for transmitting at a certain transmission frequency during transmission,
   means for imaging including an image sensor and a rolling shutter;
   means for providing a flash;
   means for operating the flash at a certain flash frequency, and
   means for determining an exposure time according to the flash frequency so that the image sensor is uniformly exposed by the rolling shutter during the determined exposure time, the flash frequency and the transmission frequency having opposing phases at any moment of time.

* * * * *

UNITED STATES PATENT AND TRADEMARK OFFICE
CERTIFICATE OF CORRECTION

PATENT NO. : 7,664,387 B2
APPLICATION NO. : 11/515347
DATED : February 16, 2010
INVENTOR(S) : Mikko Perälä and Juha Alakarhu It is certified that error appears in the above-identified patent and that said Letters Patent is hereby corrected as shown below:

In column 11, line 7 after "which" insert --when--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,664,387 B2 Page 1 of 1
APPLICATION NO. : 11/515347
DATED : February 16, 2010
INVENTOR(S) : Perälä et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Thirtieth Day of November, 2010

David J. Kappos
*Director of the United States Patent and Trademark Office*